United States Patent
Park et al.

(10) Patent No.: US 11,750,933 B2
(45) Date of Patent: Sep. 5, 2023

(54) IMAGE SENSING DEVICE

(71) Applicant: SK hynix Inc., Gyeonggi-do (KR)

(72) Inventors: Yu Jin Park, Gyeonggi-do (KR); Jae Hyun Im, Gyeonggi-do (KR); Nam Ryeol Kim, Gyeonggi-do (KR); Tae Hyun Kim, Gyeonggi-do (KR); Seong Hee Park, Gyeonggi-do (KR); Kang Bong Seo, Gyeonggi-do (KR); Jung Soon Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 119 days.

(21) Appl. No.: 17/238,420

(22) Filed: Apr. 23, 2021

(65) Prior Publication Data

US 2022/0141378 A1    May 5, 2022

(30) Foreign Application Priority Data

Nov. 4, 2020   (KR) .......................... 10-2020-0146139

(51) Int. Cl.
| | |
|---|---|
| H04N 23/741 | (2023.01) |
| G06T 7/50 | (2017.01) |
| G06T 15/80 | (2011.01) |
| H04N 23/67 | (2023.01) |
| H04N 25/704 | (2023.01) |

(52) U.S. Cl.
CPC ............. *H04N 23/741* (2023.01); *G06T 7/50* (2017.01); *G06T 15/80* (2013.01); *H04N 23/67* (2023.01); *H04N 23/672* (2023.01); *H04N 25/704* (2023.01); *G06T 2207/10024* (2013.01)

(58) Field of Classification Search
None
See application file for complete search history.

(56) References Cited

U.S. PATENT DOCUMENTS

| | | | |
|---|---|---|---|
| 10,382,666 B2 | 8/2019 | Kim et al. | |
| 2011/0058070 A1* | 3/2011 | Awazu | H04N 5/23229 348/241 |
| 2014/0347532 A1* | 11/2014 | Kang | H01L 27/14623 348/294 |
| 2015/0350583 A1* | 12/2015 | Mauritzson | H01L 27/14621 257/432 |
| 2018/0041724 A1* | 2/2018 | Kim | H04N 25/57 |
| 2020/0161352 A1 | 5/2020 | Takahashi et al. | |

* cited by examiner

Primary Examiner — Quan Pham
(74) Attorney, Agent, or Firm — IP & T GROUP LLP

(57) ABSTRACT

Disclosed is an image sensing device including a first pixel group including at least one first half-shading pixel and at least one first normal pixel, and an image processor suitable for using a first pixel signal, which is generated from the first half-shading pixel during a first period, as phase information, and using a first pixel signal, which is generated from the first half-shading pixel during a second period, as dynamic range information.

17 Claims, 4 Drawing Sheets

IMAGE SENSING DEVICE

CROSS-REFERENCE TO RELATED APPLICATION(S)

This application claims priority under 35 U.S.C. § 119 to Korean Patent Application No. 10-2020-0146139, filed on Nov. 4, 2020, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices capture images using the property of a semiconductor which reacts to light. Generally, image sensing devices may be roughly divided into charge-coupled device (CCD) image sensing devices and complementary metal-oxide semiconductor (CMOS) image sensing devices. Recently, CMOS image sensing devices are widely used because they allow both analog and digital control circuits to be directly implemented on a single integrated circuit (IC).

SUMMARY

Various embodiments of the present disclosure are directed to an image sensing device that supports a phase detection auto focus function and a high dynamic range function.

In accordance with an embodiment, an image sensing device may include: a first pixel group including at least one first half-shading pixel and at least one first normal pixel; and an image processor suitable for using a first pixel signal, which is generated from the first half-shading pixel during a first period, as phase information, and using a first pixel signal, which is generated from the first half-shading pixel during a second period, as dynamic range information.

The image processor may calculate a depth from a subject based on the phase information of the first pixel signal generated during the first period, generate a high-illuminance image based on the high dynamic range information of the first pixel signal generated during the second period, and generate a low-illuminance image based on a pixel signal generated from the first normal pixel during the second period.

The image sensing device may further include a second pixel group including at least one second half-shading pixel and at least one second normal pixel, wherein the image processor may use a second pixel signal, which is generated from the second half-shading pixel during the second period, as the dynamic range information.

The first half-shading pixel may have a green color filter, and the second half-shading pixel may have a red color filter or a blue color filter.

In accordance with an embodiment, an image sensing device may include: a first pixel group including one first half-shading pixel and three first normal pixels; and an image processor suitable for using a first pixel signal, which is generated from the first half-shading pixel during a first period, as phase information, and using a first pixel signal, which is generated from the first half-shading pixel during a second period, as dynamic range information.

The image processor may calculate a depth from a subject based on the phase information of the first pixel signal generated during the first period, generate a high-illuminance image based on dynamic range information of the first pixel signal generated during the second period, and generate a low-illuminance image based on pixel signals generated from the first normal pixels during the second period.

The image sensing device may further include a second pixel group including one second half-shading pixel and three second normal pixels, wherein the image processor may use a second pixel signal, which is generated from the second half-shading pixel during the second period, as the dynamic range information.

The first half-shading pixel may have a green color filter, and the second half-shading pixel may have a red color filter or a blue color filter.

The first period may include a time segment in which the image sensing device performs a phase detection auto focus function, and the second period may include a time segment in which the image sensing device captures an image.

In accordance with an embodiment, an image sensing device may include: a first pixel group including two first half-shading pixels and two first normal pixels; and an image processor suitable for using phase information of first pixel signals, which are generated from the first half-shading pixels during a first period, and using dynamic range information of the first pixel signals, which are generated from the first half-shading pixels during a second period.

The image processor may calculate a depth from a subject based on the phase information of the first pixel signals generated during a first period, generate a high-illuminance image based on the dynamic range information of the first pixel signals generated during a second period, and generate a low-illuminance image based on pixel signals generated from the first normal pixels during the second period.

The image sensing device may further include a second pixel group including two second half-shading pixels and two second normal pixels, wherein the image processor may use second pixel signals, which are generated from the second half-shading pixels during the second period, as the dynamic range information.

Each of the first half-shading pixels may have a green color filter, and each of the second half-shading pixels may have a red color filter or a blue color filter.

The first period may include a time segment in which the image sensing device performs a phase detection auto focus function, and the second period may include a time segment in which the image sensing device captures an image.

In accordance with an embodiment, an operating method of an image sensing device including one or more half-shading pixels and one or more normal pixels, the operating method may include: generating a half-shading pixel signal with an integration time through each of the half-shading pixels, and generating a normal pixel signal with the integration time through each of the normal pixels; generating a high illumination image based on the half-shading pixel signal and a low illumination image based on the normal pixel signal; and generating a high dynamic range image based on the high and low illumination images.

DETAILED DESCRIPTION

Various embodiments are described below with reference to the accompanying drawings to enable those skilled in art to which the present disclosure pertains to easily carry out the present invention.

It will be understood that when an element is referred to as being "connected to" or "coupled to" another element, the element may be directly connected or coupled to the another element, or electrically connected or coupled to the another element with one or more elements interposed therebetween. In addition, it will also be understood that the terms "comprises," "comprising," "includes," and "including" when used herein, specify the presence of the stated elements and do not preclude the presence or addition of one or more other elements. In the following description, a component described in singular form does not preclude there being multiple instances of such component. Throughout the specification, reference to "an embodiment," "a first embodiment" or a "second embodiment" does not necessarily refer to only one embodiment, and the term "embodiments" when used herein does not necessarily refer to all embodiments.

Figure 1:
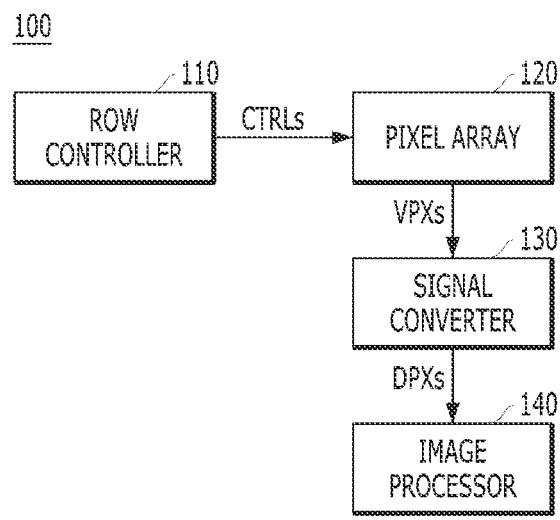
FIG. 1 is a block diagram illustrating an image sensing device in accordance with a first embodiment of the present disclosure.

FIG. 1 is a block diagram illustrating an image sensing device 100 in accordance with a first embodiment of the present disclosure.

Referring to FIG. 1, the image sensing device 100 may include a row controller 110, a pixel array 120, a signal converter 130 and an image processor 140.

The row controller 110 may generate a plurality of row control signals RCTRLs for controlling respective rows of the pixel array 120. For example, the row controller 110 may generate first row control signals for controlling pixels arranged in a first row of the pixel array 120 during a first unit row time, and generate $n^{th}$ row control signals for controlling pixels arranged in an $n^{th}$ row of the pixel array 120 during an $n^{th}$ unit row time (where "n" is a natural number greater than 2).

Figure 2:
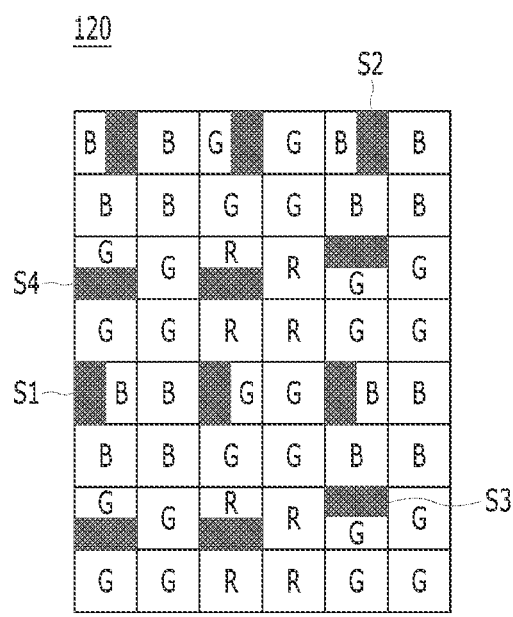
FIG. 2 is a diagram illustrating an example of a pixel array illustrated in FIG. 1.

The pixel array 120 may include pixels arranged at intersections of a plurality of rows and a plurality of columns. For example, the pixels may be arranged as shown in FIG. 2. The pixels may output a plurality of pixel signals VPXs for each row to the signal converter 130 under the control of the row controller 110. For example, the pixels arranged in the first row may generate the pixel signals VPXs during the first unit row time based on the first row control signals, and the pixels arranged in the $n^{th}$ row may generate the pixel signals VPXs during the $n^{th}$ unit row time based on the $n^{th}$ row control signals.

The signal converter 130 may generate image signals DPXs corresponding to the pixel signals VPXs. For example, the signal converter 130 may include an analog to digital converter (ADC).

Based on the image signals DPXs, the image processor 140 may process phase information related to a phase detection auto focus function during a first period, and process an image related to a high dynamic range function during a second period.

FIG. 2 is a diagram illustrating an example of the pixel array 120 illustrated in FIG. 1.

Referring to FIG. 2, the pixel array 120 may include the plurality of pixels arranged in a quad pattern. The quad pattern refers to a pattern in which pixels each having the same color of color filter are arranged in units of 2×2, Hereinafter, a group of the pixels arranged in a 2×2 unit is referred to as a unit pixel circuit.

The unit pixel circuit may include first to fourth pixels, one of which may be a half-shading pixel having a half-shading layer; the other three pixels may be normal pixels. The half-shading layer may have any one of a left shading pattern S1, a right shading pattern S2, a top shading pattern S3 and a bottom shading pattern S4. The left shading pattern S1, the right shading pattern S2, the top shading pattern S3 and the bottom shading pattern S4 do not necessarily have to be formed as illustrated in FIG. 2, and may be variously changed according to design, FIG. 3 is a circuit diagram illustrating an example of any one unit pixel circuit illustrated in FIG. 2.

Figure 3:
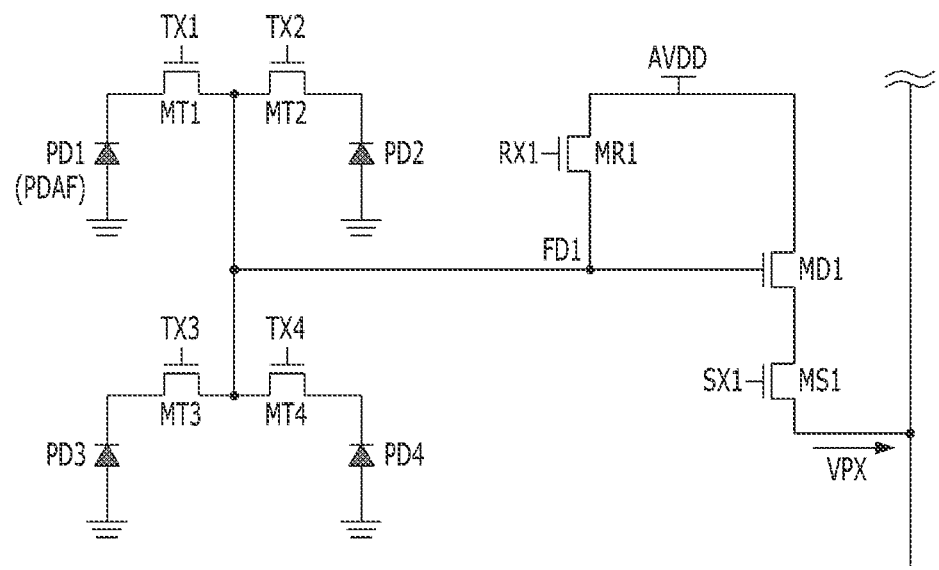
FIG. 3 is a circuit diagram illustrating an example of a unit pixel circuit illustrated in FIG. 2.

Referring to FIG. 3, the unit pixel circuit may include first to fourth photodiodes PD1, PD2, PD3 and PD4, first to fourth transmission elements MT1, MT2, MT3 and MT4, a first floating diffusion node FD1, a first reset element MR1, a first driving element MD1 and a first selection element MS1.

The unit pixel circuit may have a structure in which the first to fourth photodiodes PD1, PD2, PD3 and PD4 share the first floating diffusion node FD1, the first reset element MR1, the first driving element MD1 and the first selection element MS1.

The first photodiode PD1 may be coupled between a low voltage terminal, for example, a ground voltage terminal, and the first transmission element MT1, The second photodiode PD2 may be coupled between the low voltage terminal and the second transmission element MT2, The third photodiode PD3 may be coupled between the low voltage terminal and the third transmission element MT3, The fourth photodiode PD4 may be coupled between the low voltage terminal and the fourth transmission element MT4. The first photodiode PD1 may be related to the half-shading pixel, and the second to fourth photodiodes PD2, PD3 and PD4 may be related to the normal pixels.

The first transmission element MT1 may be coupled between the first photodiode PD1 and the first floating diffusion node FD1. The first transmission element MT1 may selectively couple the first photodiode PD1 to the first floating diffusion node FD1 based on a first transmission control signal TX1. The second transmission element MT2 may be coupled between the second photodiode PD2 and the first floating diffusion node FD1. The second transmission element MT2 may selectively couple the second photodiode PD2 to the first floating diffusion node FD1 based on a second transmission control signal TX2. The third transmission element MT3 may be coupled between the third photodiode PD3 and the first floating diffusion node FD1. The third transmission element MT3 may selectively couple the third photodiode PD3 to the first floating diffusion node FD1 based on a third transmission control signal TX3. The fourth transmission element MT4 may be coupled between the fourth photodiode PD4 and the first floating diffusion node FD1, The fourth transmission element MT4 may selectively couple the fourth photodiode PD4 to the first floating diffusion node FD1 based on a fourth transmission control signal TX4. For example, during the first period, only the first transmission control signal TX1 among the first to fourth transmission control signals TX1, TX2, TX3 and TX4 may be activated, and during the second period, the first transmission control signal TX1 may be activated and the second to fourth transmission control signals TX2, TX3 and TX4 may be activated simultaneously.

Although not illustrated in the drawing, a first parasitic capacitor may be coupled to the first floating diffusion node FD1. The first parasitic capacitor may store charges generated from the first to fourth photodiodes PD1, PD2, PD3 and PD4.

The first reset element MR1 may be coupled between a high voltage terminal, for example, a power supply voltage terminal AVDD, and the first floating diffusion node FD1. The first reset element MR1 may selectively couple the high voltage terminal to the first floating diffusion node FD1 based on a first reset control signal RX1.

The first driving element MD1 may be coupled between the high voltage terminal and the first selection element MS1. The first driving element MD1 may drive a pixel signal VPX based on a voltage loaded onto the first floating diffusion node FD1.

The first selection element MS1 may be coupled between the first driving element MD1 and a first column line COL1. The first selection element MS1 may output the pixel signal VPX to the first column line COL1 based on a first selection control signal SX1.

The first to fourth transmission control signals TX1 to TX4, the first reset control signal RX1 and the first selection control signal SX1 may be included in the row control signals RCTRLs described above.

Figure 4:
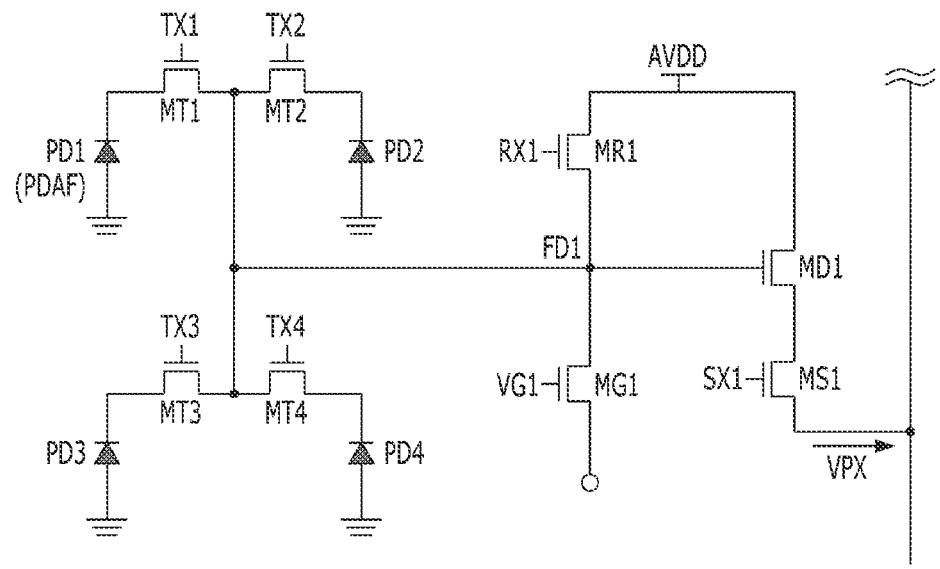
FIG. 4 is a circuit diagram illustrating another example of the unit pixel circuit illustrated in FIG. 2.

FIG. 4 is a circuit diagram illustrating another example of the any one unit pixel circuit illustrated in FIG. 2.

Referring to FIG. 4, the unit pixel circuit may include first to fourth photodiodes PD1, PD2, PD3 and PD4, first to fourth transmission dements MT1, MT2, MT3 and MT4, a first floating diffusion node FD1, a first storage element MG1, a first reset element MR1, a first driving dement MD1 and a first selection dement MS1.

Herein, since the first to fourth photodiodes PD1, PD2, PD3 and PD4, the first to fourth transmission dements MT1, MT2, MT3 and MT4, the first floating diffusion node FD1, the first reset dement MR1, the first driving element MD1 and the first selection dement MS1 are the same as those illustrated in FIG. 3, detailed descriptions thereof are omitted, and only the first storage element MG1 is described below.

The first storage element MG1 may be selectively coupled to the first floating diffusion node FD1 based on a first gain conversion signal VG1. For example, the first storage dement MG1 may be selectively coupled to the first floating diffusion node FD1 when the high dynamic range function is performed. More specifically, the first storage element MG1 may not be coupled to the first floating diffusion node FD1 during a first portion of the second period in which a high-illuminance image is generated, and may be coupled to the first floating diffusion node FD1 during a second portion of the second period in which a low-illuminance image is generated. For example, the first storage element MG1 may receive the first gain conversion signal VG1 through a gate terminal thereof, and have a source terminal and a drain terminal coupled between the first floating diffusion node FD1 and a floating node.

Hereinafter, an operation of the image sensing device 100 in accordance with the first embodiment, in which the image sensing device 100 has the above-described configuration, is described.

First, the operation of the image sensing device 100 according to the phase detection auto focus function is described.

During the first period, when the pixel array 120 generates the pixel signals VPXs, which correspond to a depth from a subject, under the control of the row controller 110, the signal converter 130 may generate the image signals DPXs corresponding to the pixel signals VPXs. The image processor 140 may calculate the depth from the subject based on some of the image signals DPXs. The image signals used to calculate the depth may correspond to pixel signals generated from the half-shading pixels among the pixels in the pixel array 120. Particularly, pixel signals generated from some of the half-shading pixels may be used as the depth-calculating image signals, in consideration of an operation quantity (i.e., throughput) of the image processor 140. For example, the half-shading pixels used in the depth calculation may each have a green color filter, Since the half-shading pixels each having the green color filter have better sensitivity and resolution than half-shading pixels each having a red color filter or a blue color filter, it may be advantageous to use the half-shading pixels each having the green color filter.

Next, the operation of the image sensing device 100 according to the high dynamic range function is described.

During the second period, when the pixel array 120 generates the pixel signals VPXs, which correspond to a captured image, under the control of the row controller 110, the signal converter 130 may generate the image signals DPXs corresponding to the pixel signals VPXs. The image processor 140 may generate the high-illuminance image based on first image signals among the image signals DPXs, and generate the low-illuminance image based on second image signals. For example, the first image signals may correspond to pixel signals, respectively, which are generated from a first half-shading pixel among the pixels in the unit pixel circuit, and the second image signals may correspond to pixel signals, respectively, which are generated and synthesized from first to third normal pixels among the pixels in the unit pixel circuit. Particularly, since the half-shading pixels and the normal pixels are controlled to have the same integration time, and the half-shading pixels have the transmittance of light reduced by half compared to the normal pixels, a motion artifact may be suppressed. The image processor 140 may generate a high dynamic range image based on the high-illumination and low-illumination images. In addition, when the first storage element MG1 is included in the unit pixel circuit, a maximum output range of the second image signals corresponding to the low-illuminance image may be increased.

Figure 5:
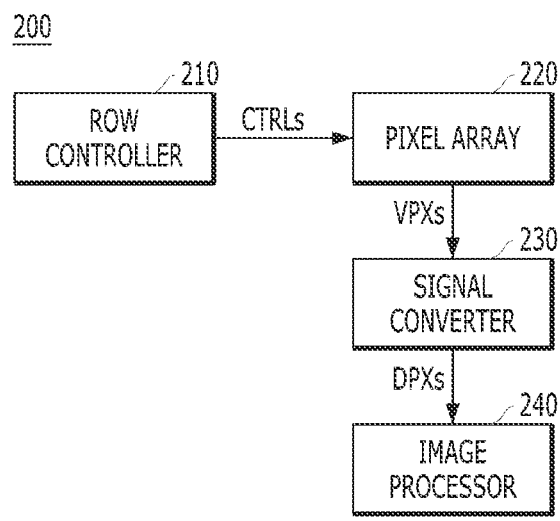
FIG. 5 is a block diagram illustrating an image sensing device in accordance with a second embodiment of the present disclosure.

FIG. 5 is a block diagram illustrating an image sensing device 200 in accordance with a second embodiment of the present disclosure.

Referring to FIG. 5, the image sensing device 200 may include a row controller 210, a pixel array 220, a signal converter 230 and an image processor 240.

The row controller 210 may generate a plurality of row control signals RCTRLs for controlling respective rows of the pixel array 220. For example, the row controller 210 may generate first row control signals for controlling pixels arranged in a first row of the pixel array 220 during a first unit row time, and generate n$^{th}$ row control signals for controlling pixels arranged in an n$^{th}$ row of the pixel array 220 during an n$^{th}$ unit row time (where "n" is a natural number greater than 2).

The pixel array 220 may include pixels arranged at intersections of a plurality of rows and a plurality of columns. For example, the pixels may be arranged in a quad pattern as shown FIG. 6. The pixels may output a plurality of pixel signals VPXs for each row to the signal converter 230 under the control of the row controller 210. For example, the pixels arranged in the first row may generate the pixel signals VPXs during the first unit row time based on the first row control signals, and the pixels arranged in the n$^{th}$ row may generate the pixel signals VPXs during the n$^{th}$ unit row time based on the n$^{th}$ row control signals.

The signal converter 230 may generate image signals DPXs corresponding to the pixel signals VPXs. For example, the signal converter 230 may include an analog to digital converter (ADC).

Based on the image signals DPXs, the image processor 240 may process phase information related to a phase detection auto focus function during a first period, and process an image related to a high dynamic range function during a second period.

Figure 6:
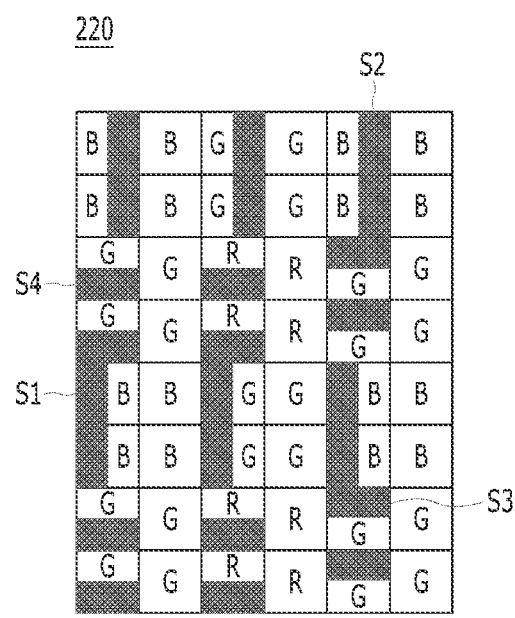
FIG. 6 is a diagram illustrating an example of a pixel array illustrated in FIG. 5.

FIG. 6 is a diagram illustrating an example of the pixel array 220 illustrated in FIG. 5.

Referring to FIG. 6, the pixel array 220 may include the plurality of pixels arranged in the quad pattern. The quad pattern refers to a pattern in which pixels each having the same color of color filter are arranged in units of 2×2. Hereinafter, a group of the pixels arranged in a 2×2 unit is referred to as a unit pixel circuit.

The unit pixel circuit may include first to fourth pixels, two of which may be half-shading pixels each having a half-shading layer. The other two pixels may be normal pixels. The half-shading layer may have any one of a left shading pattern S1, a right shading pattern S2, a top shading pattern S3 and a bottom shading pattern S4. The left shading pattern S1, the right shading pattern S2, the top shading pattern S3 and the bottom shading pattern S4 do not necessarily have to be formed as illustrated in FIG. 6, and may be variously changed according to design.

Figure 7:
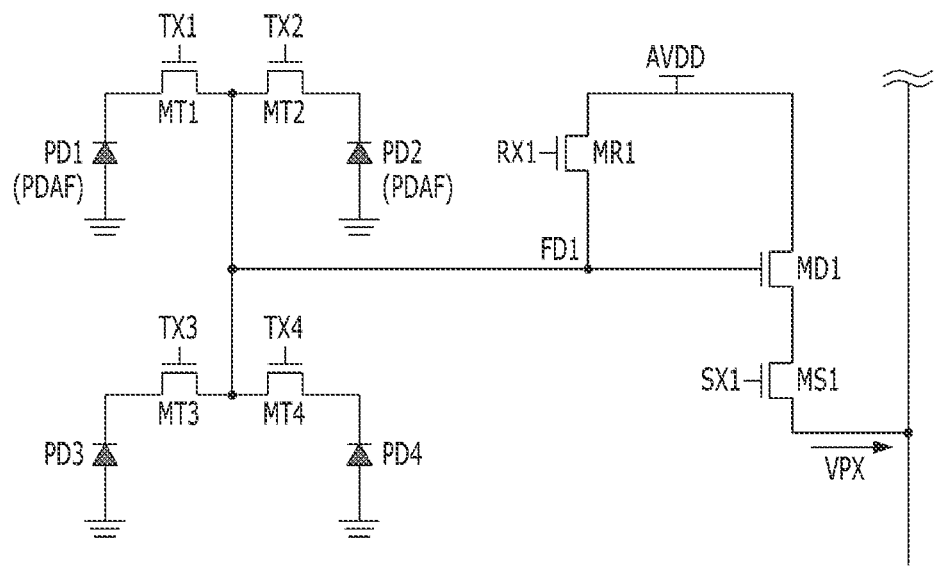
FIG. 7 is a circuit diagram illustrating an example of a unit pixel circuit illustrated in FIG. 6.

FIG. 7 is a circuit diagram illustrating an example of any one unit pixel circuit illustrated in FIG. 6.

Referring to FIG. 7, the unit pixel circuit may include first to fourth photodiodes PD1, PD2, PD3 and PD4, first to fourth transmission elements MT1, MT2, MT3 and MT4, a first floating diffusion node FD1, a first reset element MR1, a first driving element MD1 and a first selection element MS1.

The unit pixel circuit may have a structure in which the first to fourth photodiodes PD1, PD2, PD3 and PD4 share the first floating diffusion node FD1, the first reset element MR1, the first driving element MD1 and the first selection element MS1.

The first photodiode PD1 may be coupled between a low voltage terminal, for example, a ground voltage terminal, and the first transmission element MT1. The second photodiode PD2 may be coupled between the low voltage terminal and the second transmission element MT2. The third photodiode PD3 may be coupled between the low voltage terminal and the third transmission element MT3. The fourth photodiode PD4 may be coupled between the low voltage terminal and the fourth transmission element MT4. The first and second photodiodes PD1 and PD2 may be related to the half-shading pixels, and the third and fourth photodiodes PD3 and PD4 may be related to the normal pixels.

The first transmission element MT1 may be coupled between the first photodiode PD1 and the first floating diffusion node FD1. The first transmission element MT1 may selectively couple the first photodiode PD1 to the first floating diffusion node FD1 based on a first transmission control signal TX1. The second transmission element MT2 may be coupled between the second photodiode PD2 and the first floating diffusion node FD1. The second transmission element MT2 may selectively couple the second photodiode PD2 to the first floating diffusion node FD1 based on a second transmission control signal TX2. The third transmission element MT3 may be coupled between the third photodiode PD3 and the first floating diffusion node FD1. The third transmission element MT3 may selectively couple the third photodiode PD3 to the first floating diffusion node FD1 based on a third transmission control signal TX3. The fourth transmission element MT4 may be coupled between the fourth photodiode PD4 and the first floating diffusion node FD1. The fourth transmission element MT4 may selectively couple the fourth photodiode PD4 to the first floating diffusion node FD1 based on a fourth transmission control signal TX4, For example, during the first period, only the first and second transmission control signals TX1 and TX2 among the first to fourth transmission control signals TX1, TX2, TX3 and TX4 may be sequentially activated, and during the second period, the first and second transmission control signals TX1 and TX2 may be activated simultaneously, and the third and fourth transmission control signals TX3 and TX4 may be activated simultaneously.

Although not illustrated in the drawing, a first parasitic capacitor may be coupled to the first floating diffusion node FD1. The first parasitic capacitor may store charges generated from the first to fourth photodiodes PD1, PD2, PD3 and PD4.

The first reset element MR1 may be coupled between a high voltage terminal, for example, a power supply voltage terminal AVDD, and the first floating diffusion node FD1. The first reset element MR1 may selectively couple the high voltage terminal to the first floating diffusion node FD1 based on a first reset control signal RX1.

The first driving element MD1 may be coupled between the high voltage terminal and the first selection element MS1. The first driving element MD1 may drive a pixel signal VPX based on a voltage loaded onto the first floating diffusion node FD1.

The first selection element MS1 may be coupled between the first driving element MD1 and a first column line COL1. The first selection element MS1 may output the pixel signal VPX to the first column line COL1 based on a first selection control signal SX1.

The first to fourth transmission control signals TX1 to TX4, the first reset control signal RX1 and the first selection control signal SX1 may be included in the row control signals RCTRLs described above.

Figure 8:
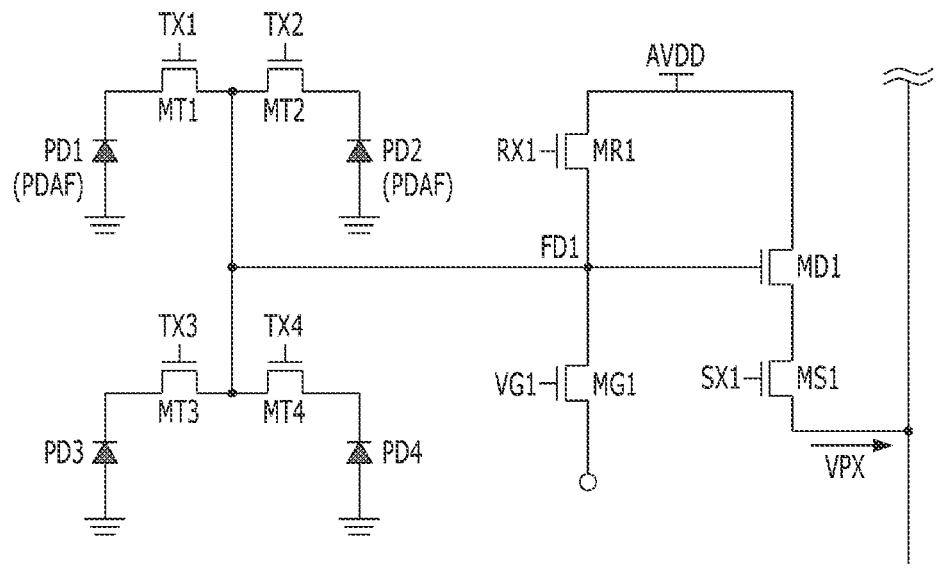
FIG. 8 is a circuit diagram illustrating another example of the unit pixel circuit illustrated in FIG. 6.

FIG. 8 is a circuit diagram illustrating another example of the any one unit pixel circuit illustrated in FIG. 6.

Referring to FIG. 8, the unit pixel circuit may include first to fourth photodiodes PD1, PD2, PD3 and PD4, first to fourth transmission elements MT1, MT2, MT3 and MT4, a first floating diffusion node FD1, a first storage element MG1, a first reset element MR1, a first driving element MD1 and a first selection element MS1.

Herein, since the first to fourth photodiodes PD1, PD2, PD3 and PD4, the first to fourth transmission elements MT1, MT2, MT3 and MT4, the first floating diffusion node FD1, the first reset element MR1, the first driving element MD1 and the first selection element MS1 are the same as those illustrated in FIG. 7, detailed descriptions thereof are omitted, and only the first storage element MG1 is described below.

The first storage element MG1 may be selectively coupled to the first floating diffusion node FD1 based on a first gain conversion signal VG1. For example, the first storage element MG1 may be selectively coupled to the first floating diffusion node FD1 when the high dynamic range function is performed. According to an example, the first storage element MG1 may be coupled to the first floating diffusion node FD1 during a period of the second period in which a high-illuminance image is generated, and may not be coupled to the first floating diffusion node FD1 during a period of the second period in which a low-illuminance image is generated. The high-illuminance image may be generated based on first image signals generated from half-shading pixels, and the low-illuminance image may be generated based on second image signals generated from normal pixels. According to another example, the first storage element MG1 may be coupled to the first floating diffusion node FD1 during the period of the second period in which the high-illuminance image is generated, and may be coupled to the first floating diffusion node FD1 during the period of the second period in which the low-illuminance image is generated. For example, the first storage element MG1 may receive the first gain conversion signal VG1 through a gate terminal thereof, and have a source terminal and a drain terminal coupled between the first floating diffusion node FD1 and a floating node.

Hereinafter, an operation of the image sensing device 200 in accordance with the second embodiment, in which the image sensing device has the configuration described with respect to FIGS. 7 and 8, is described.

First, the operation of the image sensing device 200 according to the phase detection auto focus function is described.

During the first period, when the pixel array 220 generates the pixel signals VPXs, which correspond to a depth from a subject, under the control of the row controller 210, the signal converter 230 may generate the image signals DPXs corresponding to the pixel signals VPXs. The image processor 240 may calculate the depth from the subject based on some of the image signals DPXs. The image signals used to calculate depth may correspond to the pixel signals generated from the half-shading pixels among the pixels in the pixel array 120, Particularly, pixel signals generated from some of the half-shading pixels may be used as the depth-calculating image signals, in consideration of an operation quantity (i.e., throughput) of the image processor 240, For example, the half-shading pixels used in the depth calculation may each have a green color filter. Since the half-shading pixels each having the green color filter have better sensitivity and resolution than half-shading pixels each having a red color filter or a blue color filter, it may be advantageous to use the half-shading pixels each having the green color filter.

Next, the operation of the image sensing device 200 according to the high dynamic range function is described.

During the second period, when the pixel array 220 generates the pixel signals VPXs, which correspond to a captured image, under the control of the row controller 210, the signal converter 230 may generate the image signals DPXs corresponding to the pixel signals VPXs. The image processor 240 may generate the high-illuminance image based on the first image signals among the image signals DPXs, and generate the low-illuminance image based on second image signals. For example, the first image signals may correspond to pixel signals, respectively, which are generated and synthesized from first and second half-shading pixels among the pixels included in the unit pixel circuit, and the second image signals may correspond to pixel signals, respectively, which are generated and synthesized from first and second normal pixels among the pixels included in the unit pixel circuit. Particularly, since the half-shading pixels and the normal pixels are controlled to have the same integration time, and the half-shading pixels have the transmittance of light reduced by half compared to the normal pixels, a motion artifact may be suppressed. The image processor 240 may generate a high dynamic range image based on the high-illumination and low-illumination images. In addition, when the first storage element MG1 is included in the unit pixel circuit, a maximum output range of the second image signals corresponding to the low-illuminance image may be increased.

According to embodiments of the present disclosure, pixels related to the phase detection auto focus function can be arranged over the entire area of an image, and the pixels can also be utilized for a high dynamic range function.

According to embodiments of the present disclosure, pixels related to a phase detection auto focus function can be arranged over the entire area of an image, and also can be utilized for a high dynamic range function, thereby obtaining an image within a high dynamic range while improving the accuracy of the phase detection auto focus function.

While the present disclosure has been illustrated and described with respect to specific embodiments, various changes and modifications may be made as those skilled in the art will recognize in light of the present disclosure. Thus, none of the disclosed embodiments nor any particular detail is intended to be restrictive. The present disclosure encompasses all variations that fall within the scope of the claims.

What is claimed is:

1. An image sensing device comprising:
   a first pixel group including at least one first half-shading pixel and at least one first normal pixel; and
   an image processor suitable for calculating a depth from a subject by using a first pixel signal, which is generated from the first half-shading pixel during a first period, as phase information, generating a high-illuminance image by using a first pixel signal, which is generated from the first half-shading pixel without using a normal pixel signal generated from the first normal pixel during a second period, as dynamic range information, generating a low-illuminance image by using the normal pixel signal generated from the first normal pixel without using the first pixel signal during the second period, and generating a high dynamic range image by synthesizing the high-illuminance image and the low-illuminance image,
   wherein the first half-shading pixel and the first normal pixel are controlled to have the same integration time.

2. The image sensing device of claim 1, further comprising a second pixel group including at least one second half-shading pixel and at least one second normal pixel,
   wherein the image processor uses a second pixel signal, which is generated from the second half-shading pixel during the second period, as the dynamic range information.

3. The image sensing device of claim 2, wherein the first half-shading pixel has a green color filter, and the second half-shading pixel has a red color filter or a blue color filter.

4. The image sensing device of claim 2, wherein the first half-shading pixel includes a first half-shading layer, the second half-shading pixel includes a second half-shading layer, and each of the first and second half-shading layers has any one of a left shading pattern, a right shading pattern, a top shading pattern and a bottom shading pattern.

5. The image sensing device of claim 1, wherein the first period includes a time segment in which the image sensing device performs a phase detection auto focus function, and the second period includes a time segment in which the image sensing device captures an image.

6. An image sensing device comprising:
a first pixel group including one first half-shading pixel and three first normal pixels; and
an image processor suitable for calculating a depth from a subject by using a first pixel signal, which is generated from the first half-shading pixel during a first period, as phase information, generating a high-illuminance image by using a first pixel signal, which is generated from the first half-shading pixel without using a normal pixel signal generated from the three first normal pixels during a second period, as dynamic range information, generating a low-illuminance image by using the normal pixel signals generated from the first normal pixels without using the first pixel signal during the second period, and generating a high dynamic range image by synthesizing the high-illuminance image and the low-illuminance image,
wherein the first half-shading pixel and the first normal pixels are controlled to have the same integration time.

7. The image sensing device of claim 6, further comprising a second pixel group including one second half-shading pixel and three second normal pixels,
wherein the image processor uses a second pixel signal, which is generated from the second half-shading pixel during the second period, as the dynamic range information.

8. The image sensing device of claim 7, wherein the first half-shading pixel has a green color filter, and the second half-shading pixel has a red color filter or a blue color filter.

9. The image sensing device of claim 7, wherein the first half-shading pixel includes a first half-shading layer, the second half-shading pixel includes a second half-shading layer, and each of the first and second half-shading layers has any one of a left shading pattern, a right shading pattern, a top shading pattern and a bottom shading pattern.

10. The image sensing device of claim 6, wherein the first pixel group includes:
the one first half-shading pixel;
a first transmission element coupled between the one first half-shading pixel and a first floating diffusion node;
the three first normal pixels; and
first to third transmission elements coupled between the three first normal pixels and the first floating diffusion node.

11. The image sensing device of claim 6, wherein the first pixel group includes:
the one first half-shading pixel;
a first transmission element coupled between the one first half-shading pixel and a first floating diffusion node;
the three first normal pixels;
first to third transmission elements coupled between the three first normal pixels and the first floating diffusion node; and
a first storage element coupled to the first floating diffusion node and controlled by a first gain conversion signal.

12. An image sensing device comprising:
a first pixel group including two first half-shading pixels and two first normal pixels; and
an image processor suitable for calculating a depth from a subject by using phase information of first pixel signals, which are generated from the first half-shading pixels during a first period, generating a high-illuminance image by using dynamic range information of the first pixel signals, which are generated from the first half-shading pixels without using a normal pixel signal generated from the two first normal pixels during a second period, generating a low-illuminance image by using the normal pixel signals generated from the first normal pixels without using the first pixel signals during the second period, and generating a high dynamic range image by synthesizing the high-illuminance image and the low-illuminance image,
wherein the first half-shading pixels and the first normal pixels are controlled to have the same integration time.

13. The image sensing device of claim 12, further comprising a second pixel group including two second half-shading pixels and two second normal pixels,
wherein the image processor uses second pixel signals, which are generated from the second half-shading pixels during the second period, as the dynamic range information.

14. The image sensing device of claim 13, wherein each of the first half-shading pixels has a green color filter, and each of the second half-shading pixels has a red color filter or a blue color filter.

15. The image sensing device of claim 13, wherein each of the first half-shading pixels includes a first half-shading layer, each of the second half-shading pixels includes a second half-shading layer, and each of the first and second half-shading layers has any one of a left shading pattern, a right shading pattern, a top shading pattern and a bottom shading pattern.

16. The image sensing device of claim 12, wherein the first pixel group includes:
the two first half-shading pixels;
first and second transmission elements coupled between the two first half-shading pixels and a first floating diffusion node;
the two first normal pixels; and
third and fourth transmission elements coupled between the two first normal pixels and the first floating diffusion node.

17. The image sensing device of claim 12, wherein the first pixel group further includes:
the two first half-shading pixels;
first and second transmission elements coupled between the two first half-shading pixels and a first floating diffusion node;
the two first normal pixels;
third and fourth transmission elements coupled between the two first normal pixels and the first floating diffusion node; and
a first storage element coupled to the first floating diffusion node and controlled by a first gain conversion signal.

* * * * *